Patented Mar. 24, 1936

2,035,270

UNITED STATES PATENT OFFICE 2,035,270

PLASTIC COMPOSITIONS AND METHOD OF MAKING THE SAME

Lucas P. Kyrides, Webster Groves, Mo., assignor by mesne assignments, to Monsanto Chemical Company, a corporation of Delaware No Drawing. Application February 2, 1933, Serial No. 654,888

9 Claims. (Cl. 106—37)

This invention relates to the manufacture of plastic compositions which contain a nitro cellulosic composition as their base and it is more particularly directed to a novel class of high boiling solvents or plasticizers which may be used advantageously as camphor substitutes.

The object of the invention is to provide a novel class of substantially non-volatile compositions which, when incorporated with the cellulosic base, impart desirable properties thereto.

A further object of the invention is to provide a novel class of camphor substitutes which are characterized by their non-volatility, their impermeability and resistance to water, and their inordinate light fastness when in transparent or white pigmented coating compositions.

The invention likewise contemplates a class of compositions which possess an inordinate degree of compatibility with many of the varied modifying agents which are incorporated with the cellulose base for the purpose of imparting desired characteristics in the ultimate product. These agents include natural as well as synthetic resins, low boiling solvents, etc.

Nitro cellulose, which is utilized in the manufacture of films, lacquers, threads, as well as molding compositions, is commonly admixed with high boiling organic compositions for the purpose of imparting the desired degree of flexibility and plasticity to the ultimate product. In general, and except in the case of camphor, these compositions are esters as, for example, dibutyl phthalate, tricresyl phosphate, dimethyl phthalate, et al.

A large number of other products have been proposed but due to the exacting requirements regarding compatibility, light stability, water resistance and particularly low cost, few, other than those mentioned, have enjoyed commercial use. Dibutyl phthalate and tricresyl phosphate leave much to be desired as regards light stability, particularly when the ultimate product is utilized in a transparent or white pigmented coating composition that is exposed in the course of its normal use to actinic rays, such as occur in ordinary sunlight.

I have found that the hydrogenated reaction products of a phenol with a benzyl chloride, or a benzal chloride, as well as the neutral carboxylic acid esters of these hydrogenated products and the ketones derived from the hydrogenated products possess characteristics which render them peculiarly suited to the cellulose nitrate plastic and film arts.

In general the hydrogenation reaction products, (as well as their ketone and ester derivatives) of unsubstituted benzyl chloride or benzal chloride with phenols, are preferred. Similarly, the phenols preferred are the unsubstituted hydroxy benzene compositions including, however, the alkyl substituted hydroxy benzenes, such as cresol and xylenol which phenols are otherwise unsubstituted.

A method of preparing compositions contemplated by the present invention is hereinafter set forth, it being understood that the invention is not limited to any particular method of procedure or synthesis. For this purpose benzyl phenol and its derivatives will be used as an example. It is prepared conveniently by heating benzyl chloride with an excess of phenol. A catalyst such as ZnCl$_2$ may be used but is not necessary. Hydrogen chloride is liberated in accordance with the following reactions:

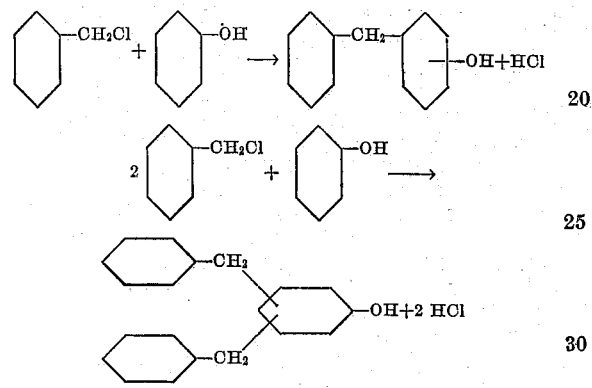

The use of an excess of phenol retards the dibenzyl phenol formation.

The resulting mixture of the mono and di substituted phenolic products may be fractionated, preferably in vacuo, to separate the mono substituted product if desired. However, the mixture may be utilized directly if desired.

Hydrogenation of the mixture is effected advantageously by subjecting the benzyl phenol or mixture of benzyl phenol and dibenzyl phenol to hydrogen in the presence of a hydrogenating catalyst such as nickel. The reaction proceeds smoothly at a temperature of 200°–220° C. and a hydrogen pressure of 50–100 atmospheres. The method of preparing the hydrogenation catalyst may well follow that commonly employed in the preparation of other hydrogenating catalysts as is well understood by those skilled in this art.

After the consumption of hydrogen has subsided, the reaction mixture, consisting essentially of the hydrogenated benzyl phenols, is separated from the catalytic composition and fractionated.

In the event the ketone is desired it may be formed conveniently by releasing the hydrogen after the consumption of hydrogen has subsided whereby the catalyst functions to dehydrogenate the product thereby converting it into the hydrogenated ketone in accordance with the following reaction:

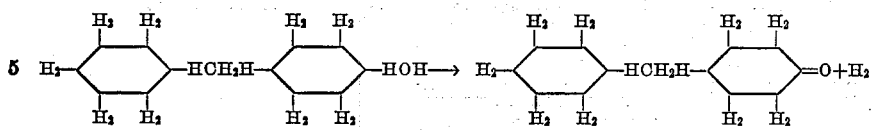

The reaction proceeds smoothly at 200°–250° C. Obviously, the precise temperature and pressure conditions as well as the time of reaction varies with the nature and activity of the catalyst.

The ketone, from the hydrogenated benzyl phenol is then separated from the catalyst and purified by distillation or in any other suitable manner.

The esters of the hydrogenated benzyl phenols and dibenzyl phenols are made conveniently by reacting the hydrogenated phenols with an acid or an acid anhydride.

A desirable class of ester compositions consists of the mixed esters of dicarboxylic acids and are made by reacting molar quantities of a dicarboxylic acid anhydride such as phthalic anhydride or succinic anhydride and the hydrogenated benzyl phenol in accordance with the following reaction:

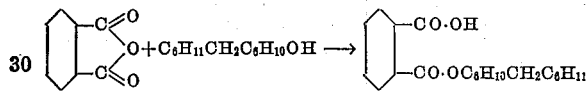

The half acid ester so produced may be reacted with an additional molar quantity of the same or another hydrogenated benzyl phenol or may be reacted with a molar quantity of another alcohol, for example, methyl, ethyl, propyl or butyl alcohol. In lieu of the simple alkyl alcohols a mono alkyl ether of ethylene glycol, cyclohexanol or benzyl alcohol may be substituted whereby a mixed neutral ester of the dicarboxylic acid is obtained.

The condensation described in the foregoing example between benzyl chloride and phenol results in a preponderance of mono benzyl phenol. If the di substituted product is desired the yield thereof may be increased by reducing the excess of phenol in the reaction mixture.

In lieu of phenol, as provided in the foregoing example, one may substitute alkyl substituted hydroxy benzenes such as a cresol, resorcinol or a xylenol in which case the corresponding condensation product of a benzyl chloride and phenol is obtained. The corresponding hydrogenation product is prepared in an analogous manner. The esterification of the hydrogenated product, as well as the ketone formation, may follow in general the procedure set forth in connection with the benzyl phenol hydrogenation product.

By substituting benzal chloride for the benzyl chloride in the foregoing examples and at the same time doubling the quantity of the phenol employed one obtains the benzylidene diphenol (dihydroxy triphenyl methane) in accordance with the following reaction:

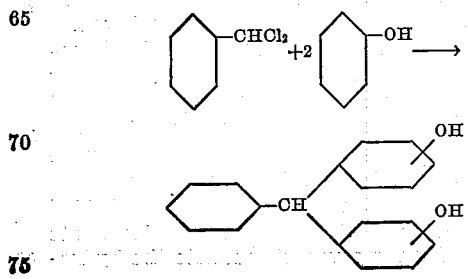

In general the benzal chloride condensation products are higher boiling than the benzyl chloride condensation products and purification by means other than distillation, as, for example, crystallization, may be resorted to as is well understood by those skilled in the art. These products may be hydrogenated to cyclohexyl-di (cyclohexanol)-methanes and the latter dehydrogenated to cyclohexyl-di (cyclohexanon)-methanes in a manner similar to that described hereinabove.

The hydrogenation of the benzyl phenol composition referred to hereinabove contemplates saturation of the phenol nucleus (or nuclei as the case may be) as well as the benzyl group. Total saturation (or hydrogenation) is, however, unnecessary and one may, if desired, interrupt the hydrogenation preferably after the phenol group has been hydrogenated but before the benzyl group has reacted substantially, if at all. This results in a benzyl substituted cyclohexanol which, in case the benzyl phenol is the raw material, produces benzyl cyclohexanol $$(C_6H_5CH_2C_6H_{10}OH).$$

Obviously the hydrogenation may be interrupted at intermediate stages, if desired. In general, compositions wherein the phenol group is saturated are preferred. In like manner the partially hydrogenated benzylidene phenol may be formed and converted into ketones and esters.

The foregoing partially hydrogenated compositions, as well as their esters and ketones, may be substituted for the corresponding completely saturated (hydrogenated) compounds prescribed in the subsequent examples.

The compositions described in the foregoing description are utilized in a manner analogous to that employed in connection with the use of dibutyl phthalate or camphor in the case of nitro cellulose compositions.

The mono hydroxy, as well as dihydroxy, alcohols resulting from the hydrogenation of the foregoing phenols may be utilized advantageously as modifying agents in the preparation of alkyd type resins wherein they displace glycerol in part. The ketones produced condense with aldehydes to form valuable resins having properties similar to those obtained by the condensation of cyclohexanon with aldehydes as, for example, formaldehyde.

The following examples will serve to illustrate embodiments of the present invention, it being understood that these are merely exemplary and do not limit their general applicability as camphor, dibutyl phthalate and dimethyl phthalate substitutes.

*Example I.*—Sufficient nitro cellulose is dissolved in a mixture of approximately equal parts by volume of butyl acetate and toluol to produce a solution of a consistency which may be desired and which will flow and form into a uniform film. Incorporate in this mixture 25% of the weight of the nitro cellulose of hexahydrobenzyl cyclohexanol (B. P. 155°/14 mm.), the hydrogenated benzyl phenol ($C_6H_{11}CH_2C_6H_{10}OH$). Spread the solution on a smooth surface to form a uniform layer and permit the butyl acetate-toluol solvent to evaporate slowly. The resulting film will be found to be tough, flexible and remarkably resistant to permeation of water or moisture. Thus, as compared to a nitro cellulose film containing no plasticizer, the decrease in moisture permeability is 60% whereas the decrease in the case of a dibutyl phthalate film is 30% or even less.

Upon exposure to a quartz light, such as is employed in obtaining light fastness data, results obtained indicate that the life, as concerns color, of a film containing 50% by weight of the hydrogenated benzyl phenol is prolonged by 400% as compared to a similar film containing dibutyl phthalate. Tricresyl phosphate containing films are even less resistant than the dibutyl phthalate films.

*Example II.*—Substitute the acetic acid ester for the hydrogenated benzyl phenol provided in the previous example. The characteristics of the film product are much the same as those of films made from the unesterified material. The ester has the advantage of lack of odor; moreover, it has a perceptible gelatinizing action on nitro cellulose which is indicative of marked solvent power.

*Example III.*—Substitute hexahydrobenzyl cyclohexanone (B. P. 155° at 14 mm.), the ketone of the hydrogenated benzyl phenol for the hydrogenated benzyl phenol of Example I. The water resistance and compatibility are excellent; moreover, the gelatinizing action is even more pronounced than in the case of the ester.

*Example IV.*—In lieu of the acetic acid ester of Example II substitute the benzoic acid ester.

*Example V.*—In lieu of hydrogenated benzyl phenol in Example I substitute the hydrogenated mixture of benzyl phenol and dibenzyl phenol or the hydrogenated benzyl cresol.

*Example VI.*—Hexahydrobenzylidene dicyclohexanol, the hydrogenated benzylidene diphenol (di-hydroxy-triphenyl methane) is substituted for the hydrogenated benzyl phenol of Example I.

*Example VII.*—Substitute an equal weight of the acetic acid ester of a hydrogenated benzyl cresol for the hydrogenated benzyl phenol of Example I.

In lieu of the toluol-butyl acetate solvent one may substitute a composite solvent embodying a wide variety of relatively low boiling compositions as is well understood by those skilled in the art. One such composite solvent may consist of a mixture which contains the following ratio of ingredients:

25% active solvent such as ethyl acetate, butyl acetate, etc.
20% alcohol such as denatured alcohol, butyl alcohol, etc.
55% hydrocarbon such as benzol, toluol, etc.

Similarly, one may add gums and resins of natural or synthetic origin, examples of which are shellac and alkyd resins respectively. Obviously, pigments and dyes may be employed if desired.

From the foregoing description it will be evident that I have provided a novel class of compositions for use as camphor substitutes which impart an inordinate degree of light fastness, water resistance and impermeability to a nitro cellulose product. These compositions may be represented structurally:

where $RCH_2$ is a benzyl or hydrogenated benzyl radical and X is a hydrogenated aryl radical embodying a hydroxyl group, a ketone group or an ester group. Alternatively, the compositions may take the form:

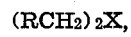

in which case the hydrogenated hydroxylated aryl radical X has two benzyl or hydrogenated benzyl radicals joined thereto; or the composition may take the form:

wherein RCH is a benzylidene or hydrogenated benzylidene group and X represents a hydrogenated hydroxylated aryl radical.

Obviously other methods of preparing the plasticizing compositions may be employed without departing from the scope of this invention.

In the claims the expression "hydrogenated reaction product" contemplates partially, as well as completely, hydrogenated (saturated) products.

What I claim is:

1. A nitro cellulose composition admixed with a hydrogenated reaction product of a phenol with toluene containing 1 to 2 chlorine atoms in the side chain.

2. A nitro cellulose composition and a hydrogenated reaction product of a phenol and benzyl chloride.

3. A nitro cellulose composition admixed with a carboxylic acid ester of the hydrogenated reaction product of a phenol with a material selected from a group consisting of toluene containing 1 to 2 chlorine atoms in the side chain.

4. A nitro cellulose composition admixed with an acetic acid ester of the hydrogenated reaction product of a phenol with toluene containing 1 to 2 chlorine atoms in the side chain.

5. A nitrocellulose composition admixed with a material selected from the group: the alcohol resulting from the hydrogenation of a reaction product of phenol with toluene containing from 1 to 2 chlorine atoms substituted in the side chain, the ketone of said alcohol, and the carboxylic acid ester of said alcohol.

6. A nitrocellulose composition embodying a hydrogenated product having the formula:

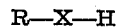

where R is a cyclical hydrocarbon group containing 6 carbon atoms and hydrogen and X is a methyl group containing 1 to 2 cyclohexanol groups substituted therein.

7. A nitrocellulose composition comprising a mixture of nitrocellulose with a hydrogenated reaction product of toluene containing 1 to 2 chlorine atoms substituted in the side chain and a phenol containing 1 to 2 hydroxy groups and not more than 2 methyl groups substituted therein.

8. A nitrocellulose composition admixed with an ester of a monocarboxylic acid and the hydrogenated reaction product of a phenol and a side chain halogenated toluene.

9. A nitrocellulose composition admixed with an ester of a dicarboxylic acid and a hydrogenated reaction product of a side chain halogenated toluene and a phenol.

LUCAS P. KYRIDES.

CERTIFICATE OF CORRECTION.

atent No. 2,035,270. March 24, 1936.

LUCAS P. KYRIDES.

It is hereby certified that error appears in the printed specification of the above numbered patent requiring correction as follows: Page 3, second column, line 35-36, claim 3, strike out the words "a material selected from a group consisting of"; and that the said Letters Patent should be read with this correction therein that the same may conform to the record of the case in the Patent Office.

Signed and sealed this 11th day of August, A. D. 1936.

Seal)

Henry Van Arsdale
Acting Commissioner of Patents.